(12) United States Patent
Kaul et al.

(10) Patent No.: US 6,482,817 B1
(45) Date of Patent: Nov. 19, 2002

(54) HYBRID PIGMENTS

(75) Inventors: Bansi Lal Kaul, Biel-Benken (CH); Bruno Piastra, Huningue (FR); Carsten Plug, Weil am Rhein-Haltingen (DE); Pascal Steffanut, Colmar (FR); Roland Born, Leymen (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/552,066

(22) Filed: Apr. 19, 2000

(30) Foreign Application Priority Data

Apr. 22, 1999 (GB) ............................... 9909105
Mar. 10, 2000 (GB) ............................... 0005663

(51) Int. Cl.$^7$ ................... A01N 55/02; A61K 31/555
(52) U.S. Cl. ........................... 514/185; 514/186
(58) Field of Search ............... 424/63; 514/185, 514/186

(56) References Cited

U.S. PATENT DOCUMENTS

| | | | |
|---|---|---|---|
| 5,084,068 A | 1/1992 | Moser et al. | |
| 5,126,443 A | 6/1992 | Moser et al. | |
| 5,455,334 A | 10/1995 | Wald | |
| 5,563,260 A | 10/1996 | Kaul et al. | |
| 5,565,563 A | * 10/1996 | Kaul et al. ............ | 544/74 |
| 5,665,871 A | 9/1997 | Pedrazzi | |
| 5,847,111 A | 12/1998 | Wald et al. | |
| 5,882,360 A | 3/1999 | Bauer et al. | |
| 6,162,261 A | 12/2000 | Kempter et al. | |
| 6,255,482 B1 | 7/2001 | Boeglin et al. | |
| 6,355,795 B1 | 3/2002 | Boeglin et al. | |

FOREIGN PATENT DOCUMENTS

| DE | 44 42 291 | 6/1995 |
|---|---|---|
| DE | 197 27 079 | 1/1999 |
| GB | 2 283 980 | 5/1995 |
| GB | 2 284 427 | 6/1995 |
| WO | 9832800 | * 7/1998 |

OTHER PUBLICATIONS

B.L. Kaul, 295.Studies on Heterocyclic Colouring Matters Part II$^1$): Δ–Bi(2H–1, 4–benzothiazines), Helvetica Chimica Acta—vol., 57, Fasc. 8 (1974)–Nr. 195, pp. 2664–2678.
UK Search Report.
Derwent Patent Family Abstract for EP 0 911 337.

* cited by examiner

Primary Examiner—Alton N Pryor
(74) Attorney, Agent, or Firm—Anthony A. Bisulca

(57) ABSTRACT

The invention provides hybrid pigments containing:
(a) at least one benzimidazolone triphenodioxazine compound of the formula (I)

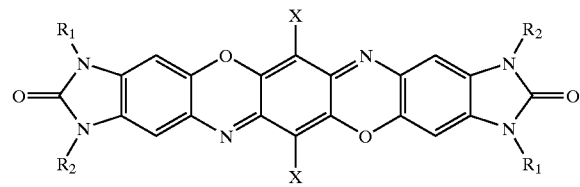

and
(b) at least one pyrrolo-[3,4-c]-pyrrole compound, or
(c) at least one thiazine-indigo compound, or
(d) at least one quinacridone compound or
(e) at least one copper phthalocyanine compound and a process for the preparation of such hybrid pigments and their use for the mass pigmentation of substrates, as colorants in electrophotographic toners and developers, in powders and powder coating materials, in ink-jet inks and in cosmetic compositions.

12 Claims, No Drawings

HYBRID PIGMENTS

The present invention relates to the preparation of hybrid pigments consisting of benzimidazolone triphenodioxazines and diketopyrrolo [3,4-c] pyrrole, thiazine-indigo, quinacridone or copper phthalocyanine pigments, to a process for their preparation and to the use of the hybrid pigments for the mass pigmentation of substrates, as colorants in electrophotographic toners and developers, in powders and powder coating materials, in ink-jet inks and cosmetics.

BACKGROUND OF THE INVENTION

Benzimidazolone triphenodioxazine compounds belong to an important series of pigments. A general overview and preparation processes are described in the patents GB 2284427, DE 4442291.1 and DE 19727079 A1. These compounds are particularly useful as pigments for coloring plastics mass including both solvent-free and solvent-containing masses of plastics or plastics resins. These include oil-based or aqueous paint systems and lacquers of various kinds. These compounds are also suitable for spin coloring of viscose or cellulose acetate, for pigmenting of polyethylene, polystyrene, polyvinylchloride, rubber or artificial leather. They can also be used for printing graphic fabrics, for coloring paper masses, for coating of textiles or for any other pigment printing process. The resulting pigmentations have excellent fastness to heat, light and weathering and chemicals. The pigments retain good strength of color and have good application properties. In particular, they have good fastness to migration, blooming, overcoating and solvents.

SUMMARY OF THE INVENTION

It is known that, under certain conditions, hybrid pigments which are either solid solutions or mixed crystals or crystal mixtures having improved properties can be obtained with two or more pigments. The process of the invention describes the preparation of such hybrid pigments consisting of benzimidazolone triphenodioxazine and other pigments which can be formed in high yield and which exhibit new pigmentary properties. More specifically, the invention relates to a method for preparing mixed crystals or solid solutions or crystal mixtures by synthesizing and/or finishing of the pre-cited pigments in the presence of another pigment of the class comprising diketopyrrolo-pyrrole, thiazine-indigo, quinacridone and copper phthalocyanine. The solid solutions and/or the mixtures of a benzimidazolone triphenodioxazine pigment and another pigment can be prepared by dissolving both of them in concentrated sulfuric acid or polyphosphoric acid, at temperatures from 0° C. to 200° C., and to precipitate the pigment particles by adding ice or water or a mixture of water and an alcohol, or by pouring the acidic medium in ice or water or a mixture of water and an alcohol.

One can also use additives known in the state-of-the-art to control the particle size of the pigment.

An obvious condition for the performance of this process is the possibility to dissolve the starting materials in concentrated sulfuric or polyphosphoric acid.

With the hybrid pigments so obtained, it is possible to generate highly advantageous shifts in shades, which are of great interest. Moreover, the hybrid pigments of the present invention possess excellent dispersability, high color strength, high weather and light fastness, high saturation and outstanding heat stability in engineering plastics.

DESCRIPTION OF THE PREFERRED EMBODIMENTS

The invention, therefore, provides hybrid pigments containing:
(a) at least one benzimidazolone triphenodioxazine compound of the formula (I)

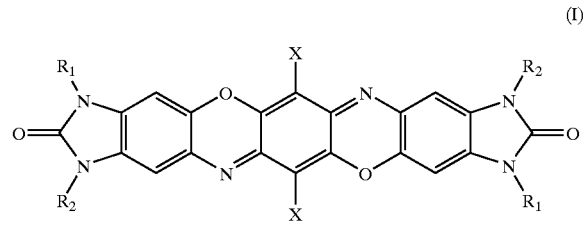

(I)

wherein
both X represent hydrogen or a halogen atom;
$R_1$ and $R_2$ are, independently of each other, hydrogen, $C_{1-18}$alkyl, unsubstituted phenyl or phenyl which is mono- or polysubstituted with halogen or nitro groups, $C_{1-8}$alkyl, trifluoromethyl or $C_{1-2}$alkoxy; and
(b) at least one pyrrolo[3,4-c]pyrrole compound of the formula (II)

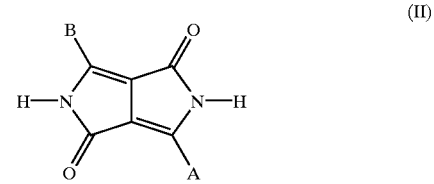

(II)

in which A and B are, independently of each other, a group of the formulae

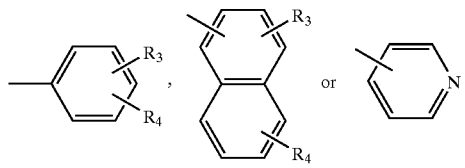

in which $R_3$ and $R_4$ are, independently of each other, hydrogen, halogen, $C_{1-5}$alkyl, $C_{1-5}$alkoxy, CN or a group of the following formulae

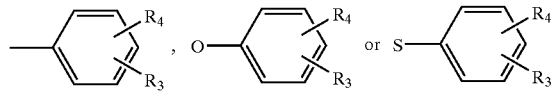

with the same meanings of $R_3$ and $R_4$ as above; or
(c) at least one thiazine-indigo compound of the formula (III)

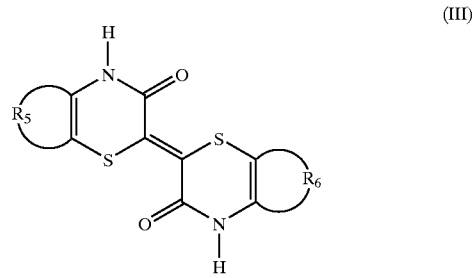

(III)

wherein
R₅ and R₆ are, independently of each other, residues which consist of the atoms necessary to complete a benzene ring which is optionally substituted with, for example halogen, alkyl, trifluoromethyl, nitro, cyano, alkyl, alkoxy, amino, alkylamino, thioalkyl, phenoxy, phenylamino, phenylthio, acyl, acyloxy or acylamino; or (d) at least one quinacridone compound of the formula (IV)

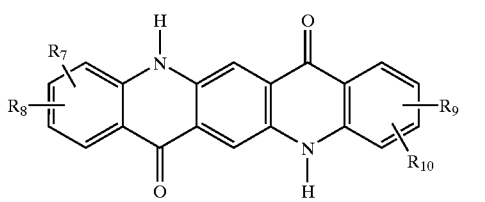

(IV)

in which
R₇, R₈, R₉ and R₁₀ are, independently of each other, hydrogen, halogen, C₁₋₅alkyl or C₁₋₅alkoxy; or (e) at least one copper phthalocyanine compound of the formula (V)

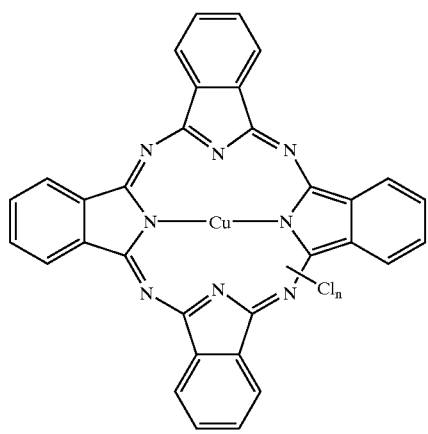

(V)

in which n=0–16 (randomly distributed).

These hybrid pigments which are either solid solutions or mixed crystals or crystal mixtures are highly suitable for use as pigments for coloring high molecular weight organic material.

The term "halogen" includes fluorine and especially chlorine and bromine. The term "alkyl" or "alkoxy" includes said functionality having from 1 to 4 carbon atoms. The terms "alkylamino" and "phenylamino" include N,N-dialkylamino and N,N-diphenylamino as well as N-monoalkylamino and N-monophenylamino. The aforementioned alkyl, alkoxy, phenyl and phenoxy substituents may themselves contain one or more substituents selected from the substituents above described.

Depending on the nature of the components which are present in the hybrid pigments of the invention, the products are either solid solutions or mixed crystals or crystal mixtures and the structure of these products can be determined by x-ray powder diffraction. In general, mixtures of similar structures will result in solid solutions or mixed crystals whereas mixtures of quite different structures will result in crystal mixtures.

This invention relates in particular to the preparation of mixed crystals or solid solutions or crystal mixtures of benzimidazolone triphenodioxazine with other pigments. The benzimidazolone triphenodioxazine pigment is obtained via a cyclisation step in concentrated sulfuric acid using manganese dioxide as oxidant. One method consists in adding to this, the diketopyrrolo [3,4-c] pyrrole or thiazine-indigo or quinacridone or copper phthalocyanine pigment at the end of the reaction. The mixture is stirred for a few hours and then discharged into water or a mixture of water and alcohol and the precipitate obtained is isolated by filtration. Mixed crystals or solid solutions or crystal mixtures of benzimidazolone triphenodioxazine and diketopyrrolo [3,4-c] pyrrole or thiazine-indigo or quinacridone or copper phthalocyanine pigments are formed thereby.

Another method is to mix already isolated benzimidazolone triphenodioxazine pigment with, for example, a diketopyrrolo [3,4-c] pyrrole pigment in concentrated sulfuric acid at a temperature in the order of 10 to 100° C., preferably from 20 to 50° C. The mixture is stirred, preferably at or below 50° C., until it is homogeneous. If necessary, the solution can be heated to a temperature in the order of 60 to 200° C., preferably from 80 to 130° C.

The hybrid pigments are then precipitated from the solution by precipitation methods known in the art. For example, suitable precipitation methods include drowning into water or an alcohol, or by adding an alcohol and/or water to the pigment solution. The water and/or alcohol can be used in any desired mixing ratio between 5 and 20 parts by weight per 1 part of the pigment formed. One can also use additives known in the state-of-the-art to control the particle size of the pigment composition. It's also possible to control the particle size of the pigment composition by heating under pressure the final pigment suspension at the end of the precipitation or the pigment suspension during the mixing step.

When the ripening of the pigment crystals is complete, the conditioned pigment is isolated by filtration, with the press-cake being washed with water or an organic solvent, preferably methanol, followed by water and dried. Better results can be obtained by filtering the pigment from a hot aqueous suspension.

The proportion of the benzimidazolone triphenodioxazine pigment in the hybrid pigments can vary between 10 and 90% by mole with 90 to 10% of diketopyrrolo [3,4-c] pyrrole or thiazine or quinacridone pigment. It's possible to form ternary hybrid pigments by mixing the thiazine-indigo or/and quinacridone pigment and/or diketopyrrolo [3,4-c] pyrrole pigment to the benzimidazolone triphenodioxazine pigment suspension.

Preferred hybrid pigments according to the invention are:
1. Solid solutions or mixed crystals containing at least one compound of the formula (I) in which R₁ or R₂ is a hydrogen radical and a diketopyrrolo [3,4-c] pyrrole of the formula (II) in which A and B are p-chlorophenyl groups.
2. Solid solutions or mixed crystals containing at least one compound of the formula (I) with the above mentioned meaning and a thiazine-indigo of the formula (III) in which R₅ and R₆ are residues which consist of the atoms necessary to complete a benzene ring which is preferably substituted with a halogen or methyl group.
3. Solid solutions or mixed crystals containing at least one compound of the formula (I) with the above mentioned meaning and a quinacridone of the formula (IV) in which R₇ and R₈ as well as R₉ and R₁₀ are hydrogen, halogen or methyl groups.
4. Solid solutions or mixed crystals containing at least one compound of the formula (I) with the above mentioned meaning and a copper phthalocyanine of the formula (V) in which n is between 0 and 2.

The hybrid pigments according to the invention are suitable for the mass pigmentation of suitable substrates including synthetic polymers, synthetic resins and regenerated fibers optionally in the presence of solvents. These substrates more particularly include oil, water and solvent based surface coatings, polyester spinning melts, polyethylene, polystyrene and polyvinyl chloride molding materials, rubber and synthetic leather. Furthermore, the pigments can be used in the manufacture of printing inks, for the mass coloration of paper and for coating and printing textiles.

Based on the polymeric material to be mass dyed, the hybrid pigments according to the invention are used in amounts of 0.01 to 30% by weight, preferably of 0.1 to 10% by weight.

The hybrid pigments according to the invention are also suitable as colorants in electrophotographic toners and developers, such as one- or two-component powder toners (also called one- or two-component developers), magnetic toners, liquid toners, polymerization toners and specialty toners (literature: L. B. Schein, "Electrophotography and Development Physics"; Springer Series in Electrophysics 14, Springer Verlag, 2$^{nd}$ Edition, 1992).

Typical toner binders are addition polymerization, polyaddition and polycondensation resins, such as styrene, styrene-acrylate, styrene-butadiene, acrylate, polyester and phenol-epoxy resins, polysulphones, polyurethanes, individually or in combination, and also polyethylene and polypropylene, which may comprise further constituents, such as charge control agents, waxes or flow assistants, or may be modified subsequently with these additives.

The hybrid pigments according to the invention are suitable, furthermore, as colorants in powders and powder coating materials, especially in triboelectrically or electrokinetically sprayable powder coating materials which are used for the surface coating of articles made, for example, from metal, wood, plastic, glass, ceramic, concrete, textile material, paper or rubber (J. F. Hughes, "Electrostatics Powder Coating" Research Studies, John Wiley & Sons, 1984).

Powder coating resins that are typically employed are epoxy resins, carboxyl- and hydroxyl-containing polyester resins, polyurethane resins and acrylic resins, together with customary hardeners. Combinations of resins are also used. For example, epoxy resins are frequently employed in combination with carboxyl- and hydroxyl-containing polyester resins. Typical hardener components (as a function of the resin system) are, for example, acid anhydrides, imidazoles and also dicyanodiamide and its derivatives, blocked isocyanates, bisacylurethanes, phenolic and melamine resins, triglycidyl isocyanurates, oxazolines and dicarboxylic acids.

In addition, the hybrid pigments according to the invention are suitable as colorants in ink-jet inks, both aqueous and non-aqueous, and in those inks, which operate in accordance with the hot-melt process.

When applied to the above-mentioned substrates the hybrid pigments are found to be resistant to migration and fast to light, and show fastness to washing, chlorite, hypochlorite and peroxide bleaching, rubbing, overspraying and solvents. Notably, the pigments display high tinctorial power, good opacity and good heat stability.

Finally, the hybrid pigments according to the invention are suitable as colorants in cosmetics.

There now follows a series of examples which serves to illustrate the invention.

EXAMPLES

Example 1

Pigment Synthesis 3,11-diphenyl-1,3,9,11-tetrahydr-diimidazo[4,5-b:4', 5'-m]triphenodioxazine-2,10-dione a) 40 parts of amino-N1-phenyl-benzimidazolone and 20 parts of 2,5-dihydroxy-1,4-benzoquinone are mixed with 200 parts of glacial acetic acid and the mixture is heated to reflux. Stirring is continued at this temperature for a further 4 hours period. The mixture is then cooled to room temperature and the formed precipitate filtered on a polypropylene filter, washed successively with 150 parts of acetic acid, the amount of water necessary to obtain a pH of the filtrate equal to 5 and 150 parts of methanol. The resulting brown powder is dried under reduced pressure for 24 hours at 80° C.

b) 15 parts of this intermediate are added to 150 parts by weight of sulfuric acid (90%) cooled at a temperature below 10° C. and stirred for 2 hours. 35 parts of activated manganese dioxide are added within 3 hours to this suspension. The mixture is stirred for 6 hours more. The excess manganese dioxide is destroyed using 5 parts of hydrogen peroxide (30%). The product is filtered off on a polypropylene filter, washed first with 150 parts of 80% concentrated sulfuric acid, and then 150 parts of 50% concentrated sulfuric acid, and subsequently washed free from sulfate with water. Drying under reduced pressure at 80° C. gives 12 parts of a metallic-green powder of a compound of the following formula:

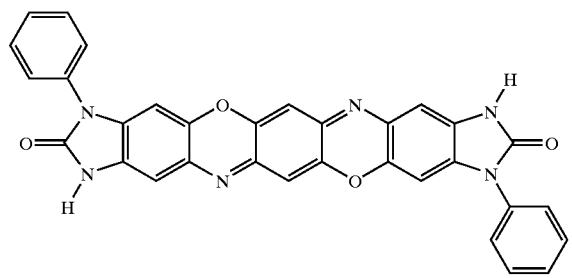

Calc. C 69.8 H 3.3 N 15.27 O 11.62%
found C 67.3 H 3.4 N 15.2 O 12.3%

Example 2

Pigment Synthesis 3,11-di(p-chloro-phenyl)-1,3,9,11-tetrahydro-diimidazo[4,5-b:4',5'-m]triphenodioxazine-2,10-dione By following the procedure of Example 1 but using amino-N1-(p-chlorophenyl)-benzimidazolone instead of amino-N1-phenyl-benzimidazolone. The crude pigment is obtained as a metallic-green powder of the following formula:

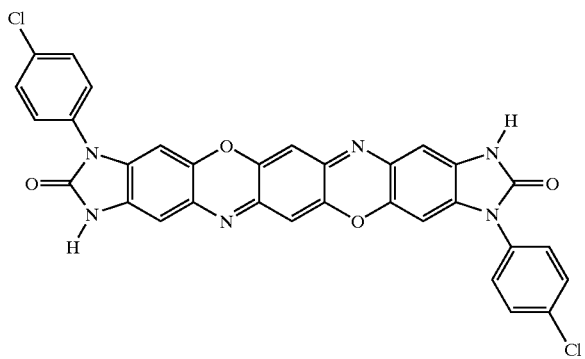

Calc.: C 62.05 H 2.6 N 13.57%;
Found: C 61.9 H 2.9 N 13.3%.

Example 3

3,11-diphenyl-1,3,9,11-tetrahydro-diimidazo[4,5-b:4',5'-m]triphenodioxazine-2,10-dione with 3,6-di(4-chlorophenyl)-1,4-diketopyrrolo-[3,4,c]-pyrrole: 50/50 molar-percent A reactor of 500 ml is charged successively with 200 ml of 90% concentrated sulfuric acid, 5 g (9.1 mmoles) of 3,11-diphenyl-1,3,9,11-tetrahydro-diimidazo[4,5-b:4',5'-m]tripheno-dioxazine-2,10-dione and 3.25 g (9.1 mmoles) of 3,6-di (4-chlorophenyl)-1,4-diketopyrrolo-[3,4,c]-pyrrole. The suspension is stirred 2 hours at 20–30° C. and then heated progressively to 50° C. over 1 hour. The reaction mixture is further stirred for 3 hours at this temperature and left cool down overnight to 20° C. The reaction mixture is then heated to 100° C. for 2 hours, gently diluted at this temperature with water to 50% concentration in $H_2SO_4$. After cooling to room temperature, the obtained water suspension is filtered and washed with 3.8 liters of water. The resulting pigment is dried at 80° C. under vacuum before testing. The red to violet pigment compositions so obtained show excellent pigment properties like dispersibility, color strength, excellent heat and light stability when applied in engineering plastics or coatings.

Example 4

3,11-diphenyl-1,3,9,11-tetrahydro-diimidazo[4,5-b:4',5'-m]triphenodioxazine-2,10-dione with trans-2,2'-bis(3-oxo-4H-7-chloro-1,4-thiazine): 50/50 molar-percent A reactor of 500 ml is charged successively with 200 ml of concentrated sulfuric acid, 5 g (9.1 mmoles) of 3,11-diphenyl-1,3,9,11-tetrahydro-diimidazo[4,5-b:4',5'-m]triphenodioxazine-2,10-dione and 3.25 g (9.1 mmoles) of trans-2,2'-bis(4H-7-chloro-1,4-thiazine). The suspension is stirred 2 hours at 20–30° C. and then heated progressively to 50° C. over 1 hour. The reaction mixture is further stirred for 3 hours at this temperature and left cool down overnight to 20° C. The reaction mixture is then heated to 130° C. for 2 hours, gently diluted at this temperature with water to 50% concentration in $H_2SO_4$. After cooling to room temperature, the obtained water suspension is filtered and washed with 2 liters of water. The resulting pigment is dried at 80° C. under vacuum before testing.

Example 5

6,14-Dichloro-3,11-diethyl-1,3,9,11-tetrahydro-diimidazo[4,5-b:4',5'-m]tripheno dioxazine-2,10-dione with copper phthalocyanine 20/80 (w/w)

A reactor of 1000 ml is charged successively with 200 g of concentrated sulfuric acid and a mixture of 4 g of 2,5-dichloro-3,6-bis(1-ethyl-2-oxo-1,3-dihydrobenzimidazol-5-yl)amino-1,4-benzoquinone and 16 g of copper phthalocyanine within 2 h. The suspension is stirred 3 hours at 60° C. and then pored into 600 ml of water. The temperature is kept below 30° C. by addition of ice. The mixture is heated to 95° C. for 2 hours and filtered at 70° C. The cake is washed with water until absence of sulfate and dried at 80° C. under vacuum.

Isolated material: 19.6 g of a dark blue powder of mp>400° C.

Calc. C, 64.6; H, 2.9; N, 18.8; Cl 2.5%;
found C, 64.7; H, 3.0; N, 18.6; Cl 2.4%.

Examples 6–9

Using the method of Examples 3–5, the following hybrid pigments are prepared:

| Ex. | Pigment I | Pigment I, II, III, IV or V | Molar % | Shade |
|---|---|---|---|---|
| 6 | (structure) | (structure) | 50/50 | Red violet |

| Ex. | Pigment I | Pigment I, II, III, IV or V | Molar % | Shade |
|---|---|---|---|---|
| 7 | (structure) | (structure) | 50/50 | Red violet |
| 8 | (structure) | (structure) | 50/50 | Magenta |
| 9 | (structure) | (structure) | 50/50 | Magenta |

Application in PVC Masstone

The preparation of a 1% colored PVC sheet is performed following the procedure:

100 parts of clear PVC are mixed with 0.1 part of pigment for 2 minutes. The mixture is passed between two rollers for 5 minutes, the front roller being heated at 130° C. and the rear roller being heated at 135° C. Then the sheet is pressed under a pressure of 25 tones between two chromium-plated steel plates heated at 165° C., for 5 minutes. The pressed sheet is colored with a red shade.

Application in PVC White

The preparation of a 0.1 % colored PVC sheet is performed following the procedure:

100 g of PVC-white (0.5% $TiO_2$) are mixed with 0.1 g of pigment for 2 minutes. The mixture is passed between two rollers for 8 minutes, the front roller being heated at 160° C. and the rear roller being heated at 165° C. Then the sheet is pressed under a pressure of 25 tones between two chromium-plated steel plates heated at 160° C., for 5 minutes.

Application in Lacquers Masstone

The preparation of the alkydmelamine (AM5) resin coating is performed following the procedure:

3.6 g of pigment, 26.4 g of clear AM5 (35%) and 85 g of glass beads are stirred in a Skandex stirrer for 30 minutes. 30 g of this preparation are mixed with 60 g of clear AM5 (55.8%). The dispersion is sprayed on a cardboard sheet, air-dried for 15 minutes and baked at 140° C. in an oven for 30 minutes.

Application in Lacquers White

The preparation of the alkydmelamine (AM5) resin coating is performed following the procedure:

3.6 g of pigment, 26.4 g of clear AM5 (35%) and 85 g of glass beads are stirred in a Skandex stirrer for 30 minutes.

7.5 g of this preparation are mixed with 20 g of AM5-white (30% TiO$_2$). The dispersion is sprayed on a cardboard sheet, air-dried for 15 minutes and baked at 140° C. in an oven for 30 minutes.

Comparative Example

The pigment produced in example 5 was applied in PVC as described above and compared to a mixture of 6,14-dichloro-3,11-diethyl-1,3,9,11-tetrahydro-diimidazo[4,5-b:4',5'-m]tripheno dioxazine-2,10-dione with copper phthalocyanine 20/80 (w/w) that was obtained by mixing the individually finished pigments as powders. The product obtained by the process described in this invention has better dispersibility, a cleaner shade and higher color force as the corresponding mixture of pigment powders.

What is claimed is:

1. Hybrid pigments comprising:
   (a) at least one benzimidazolone triphenodioxazine compound of the formula (I)

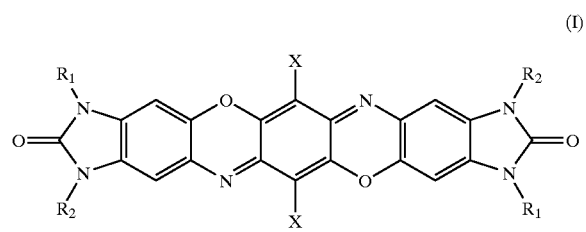

(I)

wherein
both X represent hydrogen or a halogen atom;
R$_1$ and R$_2$ are, independently of each other, hydrogen, C$_{1-18}$alkyl, unsubstituted phenyl or phenyl which is mono- or polysubstituted by halogen or nitro groups, C$_{1-8}$alkyl, trifluoromethyl or C$_{1-2}$alkoxy; and
   (b) at least one copper phthalocyanine compound of the formula (V)

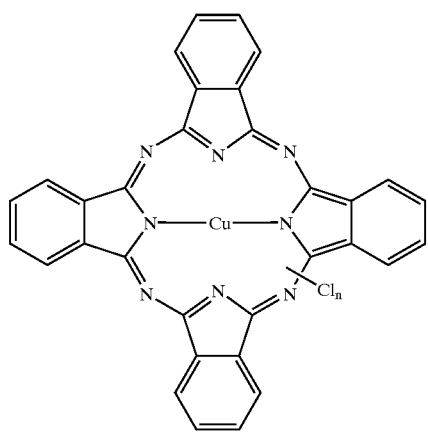

(V)

in which n=0–16.

2. A process of forming hybrid pigments comprising benzimidazolone triphenodioxazine and a copper phthalocyanine, pigment according to claim 1 comprising the steps of mixing the benximidazolone triphenodioxazine compound with the copper phthalocyanine in concentrated sulfuric acid or polyphosphoric acid and precipitating the obtained products.

3. A process according to claim 2, further comprising adding to the reaction mixture of the benzimidazolone triphenodioxazine at the end of the synthesis, a copper phthalocyanine pigment.

4. A method of using hybrid pigments as defined in claim 1 for the mass pigmentation of a substrate comprising the steps of adding said hybrid pigments to the substrate, wherein said substrate is selected from the group consisting of synthetic polymers, synthetic resins, regenerated fibers, and mixtures thereof.

5. A printing ink or textile colorant comprising hybrid pigments as defined in claim 1.

6. Printing inks or printed textiles comprising hybrid pigments as claimed in claim 1.

7. Synthetic polymers, synthetic resins and regenerated fibers comprising hybrid pigments as claimed in claim 1.

8. An electrographic toner and developer colorant comprising hybrid pigments as defined in claim 1.

9. A powder and powder coating composition colorant comprising hybrid pigments as defined in claim 1.

10. An ink jet ink colorant comprising hybrid pigments as defined in claim 1.

11. A cosmetic composition colorant comprising hybrid pigments as defined in claim 1.

12. Hybrid pigments comprising:
   (a) at least one benzimidazolone triphenodioxazine compound of the formula (I)

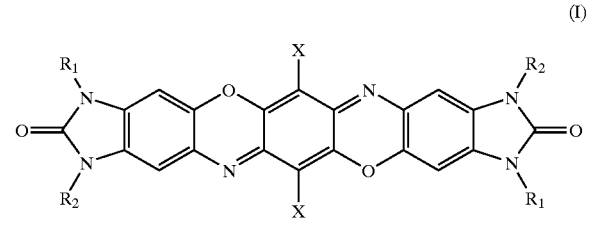

(I)

wherein
both X represent hydrogen or a halogetn atom;
R$_1$ and R$_2$ are, independently of each other, hydrogen, C$_{1-18}$alkyl, unsubstituted phenyl or phenyl which is mono- or polysubstituted by halogen or nitro groups, C$_{1-8}$alkyl, trifluoromethyl or C$_{1-2}$alkoxy; and
   (b) at least one copper phthalocyanine compound of the formula (V)

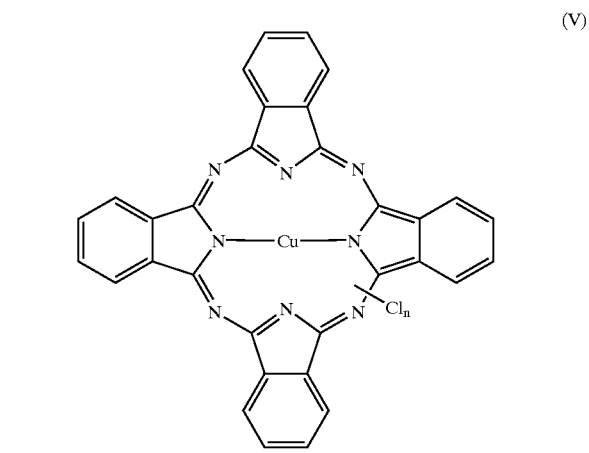

(V)

in which n=0–16
wherein said at least one benzimidazolone triphenodioxazine compound is in the form of mixed crystals, solid solutions or crystal mixtures and said at least one copper phthalocyanine compound is in the form of mixed crystals, solid solutions or crystal mixtures.

* * * * *